Aug. 15, 1950    M. S. CURTIS    2,519,117
MACHINE TOOL
Filed Jan. 24, 1946    7 Sheets-Sheet 1

FIG. 1

INVENTOR.
MYRON S. CURTIS
BY
Kuis, Hudson, Boughton & Williams
ATTORNEYS

Aug. 15, 1950   M. S. CURTIS   2,519,117
MACHINE TOOL

Filed Jan. 24, 1946   7 Sheets-Sheet 3

INVENTOR.
MYRON S. CURTIS
BY
Kavie, Hudson, Boughton & Williams
ATTORNEYS

Aug. 15, 1950   M. S. CURTIS   2,519,117
MACHINE TOOL

Filed Jan. 24, 1946   7 Sheets-Sheet 4

INVENTOR.
MYRON S. CURTIS
BY
ATTORNEYS

Aug. 15, 1950     M. S. CURTIS     2,519,117
MACHINE TOOL

Filed Jan. 24, 1946     7 Sheets-Sheet 5

INVENTOR.
MYRON S. CURTIS
BY
Kwis, Hudson, Boughton & Williams
ATTORNEYS

Aug. 15, 1950 M. S. CURTIS 2,519,117
MACHINE TOOL
Filed Jan. 24, 1946 7 Sheets-Sheet 6

INVENTOR.
MYRON S. CURTIS
BY
*Kwis, Hudson, Boughton + Williams*
ATTORNEYS

Aug. 15, 1950 — M. S. CURTIS — 2,519,117
MACHINE TOOL
Filed Jan. 24, 1946 — 7 Sheets-Sheet 7

INVENTOR.
MYRON S. CURTIS
BY
Kwis, Hudson, Boughton & Williams
ATTORNEYS

Patented Aug. 15, 1950

2,519,117

UNITED STATES PATENT OFFICE 2,519,117

MACHINE TOOL

Myron S. Curtis, Cleveland, Ohio, assignor to The Warner & Swasey Company, Cleveland, Ohio, a corporation of Ohio Application January 24, 1946, Serial No. 643,029

17 Claims. (Cl. 192—139)

This invention relates to a machine tool and particularly to an arrangement for providing a predetermined selected dwell period in which the cutting tool is in cutting but non-feeding engagement with the work following the relative feeding movement between said tool and the work.

In the operation of a machine tool of the type wherein the cutting tool is brought into cutting engagement with a relatively rotating work piece and relative feeding movement is then imparted to the tool and work piece, the force effecting such feeding movement tends to produce a heavy thrust upon the tool and its supporting slide or slides. When the relative feeding movement of the tool and work piece is stopped the heavy thrust upon the tool and its support will tend to move the tool a slightly farther distance in a feeding direction until this thrust is relieved. Consequently it is customary to provide a dwell period at the end of the feeding movement between the cutting tool and work piece and wherein the relatively rotating tool and work piece are maintained in cutting but non-feeding engagement in order to relieve the stress in the tool and its support and to finish the cut. The proper length of time for the dwell period is different under different conditions as, for instance, the character or material of the work piece, the type and depth of the cut made by the cutting tool, the rate of feed and the type of cutting tool employed.

An object of the invention is to provide in a machine tool of the type wherein the relatively rotating cutting tool and work piece are fed in cutting engagement with each other, improved and novel means for providing a predetermined selected dwell period in which the tool and work remain in cutting non-feeding engagement with each other at the end of the feeding movement and the time of which period can be varied in accordance with the particular conditions pertaining to the current operation.

Another object is to provide in a machine tool improved and novel means for providing a dwell period in which the tool and work remain in cutting non-feeding engagement with each other at the end of the feeding movement to thus remove the stress upon the cutting tool and its support, clean up the machined surface on the work piece and enable the operator to maintain accurate tolerances on the work piece and thereby increase the efficiency of the machine.

A further object is to provide in a machine tool means operatively associated with the slide moving mechanism and controlled by said mechanism for causing a predetermined delay between the end of the feeding movement of the slide and the commencement of its return movement to thereby provide a predetermined dwell period in which the rotating work piece and cutting tool remain in cutting non-feeding engagement.

A more specific object is to provide in a machine tool means for effecting a dwell period in which the relatively rotating cutting tool and work piece are in cutting non-feeding engagement, as referred to in the above mentioned objects, and which means includes a manually settable device for varying the time of said dwell period and which device is located on the front side of the machine tool where it is readily accessible to the operator.

Another object is to provide a mechanism for obtaining the dwell period referred to in the hereinbefore mentioned objects and which mechanism is of simple construction and can be readily incorporated into the machine tool.

Further and additional objects and advantages not hereinbefore referred to will become apparent hereinafter during the detailed description of several embodiments of the invention which are shown in the accompanying drawings as applied in this instance to a turret lathe.

Referring to the drawings.

Although the invention may be applied to various types of machine tools wherein the relatively rotating work piece and cutting tool are brought into cutting engagement and a relative feeding movement is imparted to the work piece and tool, it will be described herein for purposes of illustration as embodied in the actuating mechanism for the main or turret slide of a turret lathe, it being understood that such disclosure is not by way of limitation.

Figure 1:
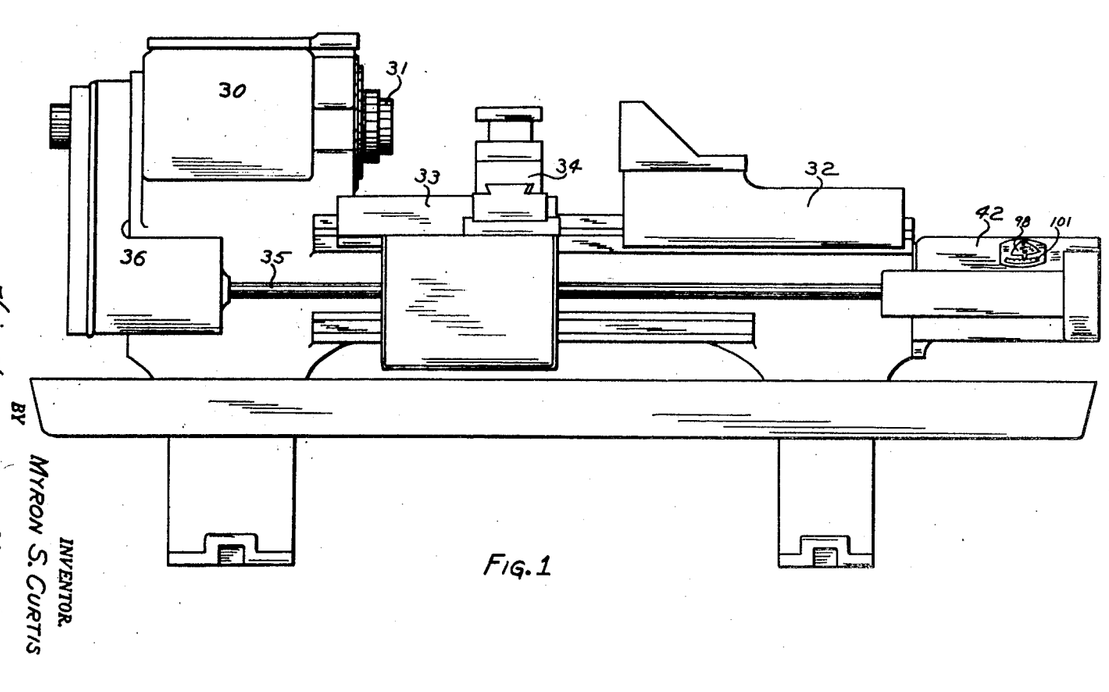
Fig. 1 is a front elevational view of a machine tool, in this instance a turret lathe, embodying the invention.

The turret lathe illustrated in the drawings and particularly referring to Fig. 1 comprises a headstock 30 having a rotatable spindle 31. The bed of the lathe is provided with ways having a main or turret slide or movable part 32 and a cross slide carriage 33 which supports a cross slide 34 as is well understood in the art. The spindle 31 may be driven at different speeds by a suitable variable speed transmission not shown as it is well known. The spindle 31 is operatively connected to a shaft slide drive 35 by means of gearing including change speed gears (not illustrated) and by means of a planetary gear unit controlled by a magnetic controller indicated by the letter C in Fig. 2, all mounted in this instance within a gear box connected to the headstock and extending in front of the machine. The gearing which connects the drive shaft 35 with the work spindle includes a gear 37 and a gear 38 shown in Fig. 2 as both formed on a gear sleeve which is rotatable on a stub shaft 39 supported in the gear box 36, it being understood that the gear 37 constantly meshes with one of the gears of the gear train that is operatively driven by the work spindle and hence whenever the work spindle is rotating the gears 37 and 38 will be driven. The gear 38 constitutes one of the gears of a planetary gear unit contained in the gear box 36 and operatively connected to the drive shaft 35 and controlled by the magnetic controller C. The planetary gear unit and the magnetic controller will be referred to in greater detail hereinafter. An electric motor M is also mounted within the gear box 36 and the rotor 40 of said motor is keyed to the drive shaft 35 while the stator and motor housing 41 are fixedly secured to the gear box 36, wherefore it will be seen that energization of the motor M will effect rotation of the shaft 35. The planetary gear unit and the motor M constitute actuating means for rotating the drive shaft 35 in opposite directions. The shaft 35 extends along the front of the bed of the lathe and in this instance through the apron of the cross slide carriage and into a gear and control mechanism box 42 secured to the end of the bed as clearly indicated in Fig. 1. The shaft 35 extends into and is rotatably supported by the box 42 and has fixed thereto within the box adjacent the end of the shaft a gear 43 which meshes with a gear 44 shown as formed integral with a sleeve portion 45 that is freely rotatable on a non-rotatable shaft 46 supported in the box 42 and extending parallel to the shaft 35. The gear 44 and sleeve 45 are held against endwise movement on the shaft 46 by a shoulder formed on said shaft and engaging internally the bottom of the sleeve 45 and by a gear later to be referred to freely rotatable on the shaft 46 and engaging the outer side of the gear 44. The sleeve portion 45 forms the driving member or part of the connecting and positioning device disclosed in the copending application of myself and Harry Schoepe, Serial No. 485,980, filed May 7, 1943, now Patent No. 2,424,153, issued July 15, 1947, and is provided adjacent its left hand end as viewed in the drawings with a radially extending boss 47 having a bore therein in which is slidably mounted a spring-pressed driving plunger 48 (see Fig. 3).

A gear 49 is freely rotatable on the shaft 46 and has an elongated hub 50 extending axially of the shaft 46 and into the sleeve portion 45 of the gear 44. The gear 49 and hub 50 constitute the driven member or part of the connecting and positioning device disclosed and claimed in said Patent No. 2,424,153. The gear 49 and hub 50 are axially shiftable on the shaft 46 and said gear 49 constantly meshes with an elongated gear 51 fixed to a driven shaft 52 which is rotatably supported in the box 42 and extends outwardly thereof toward the headstock and is provided with a screw-threaded portion 53 that cooperates with the depending nut 54 carried by the slide 32 for moving the slide or movable part in opposite directions.

The driven shaft 52 within the box 42 has fixed to it a gear 55 which meshes with a gear 56 freely rotatable on the shaft 46 intermediate one face of the gear 44 and the inner face of a bearing boss for said shaft. The gear 56 meshes with a gear 57 that is freely rotatable on the shaft 35 and is located within the box 42 intermediate one face of the gear 43 and the bearing boss for said shaft 35. The gear 57 meshes with a gear 58 that is fixed to a screw-threaded shaft 59 rotatably supported in suitable bearing bosses formed in the box 42 and extending in this instance parallel to the shafts 35, 46 and 52. An elongated block 60 is threadedly mounted on the shaft 59 and is provided in its lower face with longitudinal groove into which extends a fixed pin 61 carried by the box 42, wherefore said block 60 is held against rotation or rocking movement but is free to move endwise on the shaft 59 when the latter is rotated. It will be seen that since the shaft 59 rotates in time relation to the shaft 52 and screw 53 the block 60 will move linearly on the shaft 59 in timed relation to the linear movement of the slide 32 but in this instance at a slower rate of movement. The block 60 is provided with a longitudinally extending T-slot 62 which carries a pair of cam lugs 63 and 64 that can be relatively adjusted in said slot and then clamped in adjusted position for a purpose later to be explained.

Figure 4:
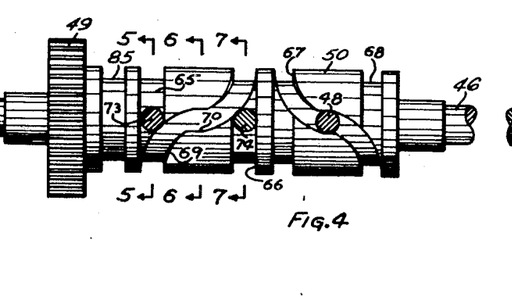
Fig. 4 is an elevational view taken substantially from line 4—4 of Fig. 3 looking in the direction of the arrows with certain of the parts shown in section.
Figure 5:
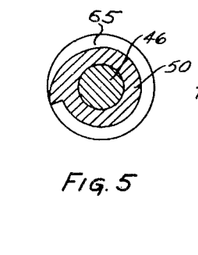
Figs. 5, 6 and 7 (sheet 2) are sectional views taken, respectively, along line 5—5, 6—6 and 7—7 of Fig. 4 looking in the direction of the arrows.
Figure 6:
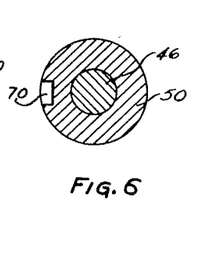
Figure 7:
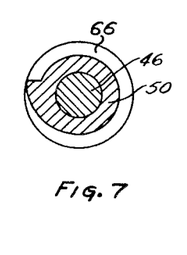
Figure 11:
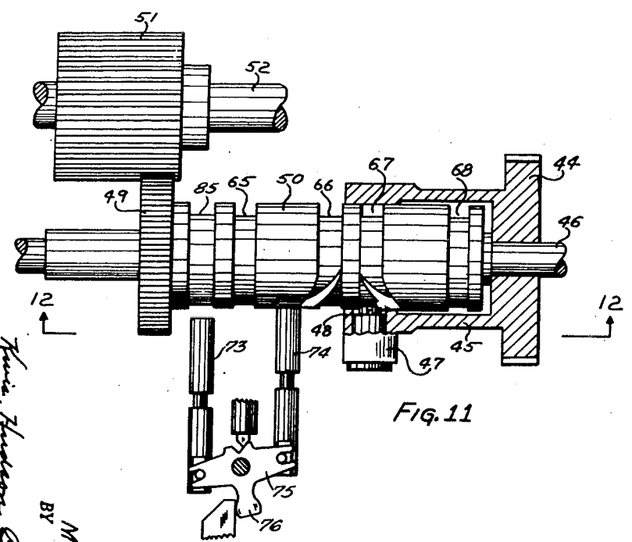
Fig. 11 (sheet 4) is a view similar to Figs. 3 and 8 but illustrating a still different relationship between the parts of the clutch and the slide actuating mechanism than is shown in Figs. 3 and 8.
Figure 12:
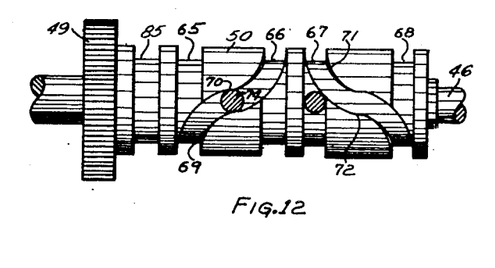
Fig. 12 is an elevational view taken substantially from line 12—12 of Fig. 11 looking in the direction of the arrows.

The hub 50 is provided with a track system shown as including four circumferential grooves 65, 66, 67 and 68, see Figs. 11 and 12. The grooves 65 and 66 are interconnected by a curved groove 69 which has a straight walled portion or section 70 midway between the grooves 65 and 66 with said straight walled section extending in a direction axially of the hub, or at right angles to the hub's rotation, see Fig. 12. The annular groove 65 has a segment of variable depth with the high point of said segment at the juncture of the curved groove 69 with the groove 65, see Figs. 4 and 5. The groove 66 also has a segment of variable depth with the high point of said segment at the juncture of the curved groove 69 and the groove 66, see Figs. 4 and 7. It will be noted that the curved groove 69 has two curved portions or sections on opposite sides of the straight walled section 70 but that such curved sections extend in opposite directions and therefore the high points of the grooves 65 and 66 are oppositely disposed with respect to their relation with the curved groove 69, as clearly indicated in Figs. 5 and 7. The annular grooves 67 and 68 are connected by a curved groove 71 having a straight walled portion or section 72 midway between the grooves. The curved groove 71 is identical with the curved groove 69 but has its curved portions or sections oppositely disposed with respect to said groove 69. Likewise the groove 67 and 68 each have a segment of variable depth with the high point thereof at the juncture of the curved groove 71 with said annular grooves similar to the high points of the grooves 65 and 66. It will be noted that the grooves 65, 66 and the curved groove 69 are symmetrical with respect to the grooves 67 and 68 and the curved groove 71 and therefore only the sectional views of Figs. 5 to 7 inclusive have been shown in the drawings illustrating the various depths of the various grooves 65 and 66 and the straight walled portion or section 70 of the curved groove 69. The form of the curved portions or sections of the grooves 69 and 71 follow a predetermined and desired curvature, as fully explained in said patent of Curtis and Schoepe, No. 2,424,153.

Figure 2:
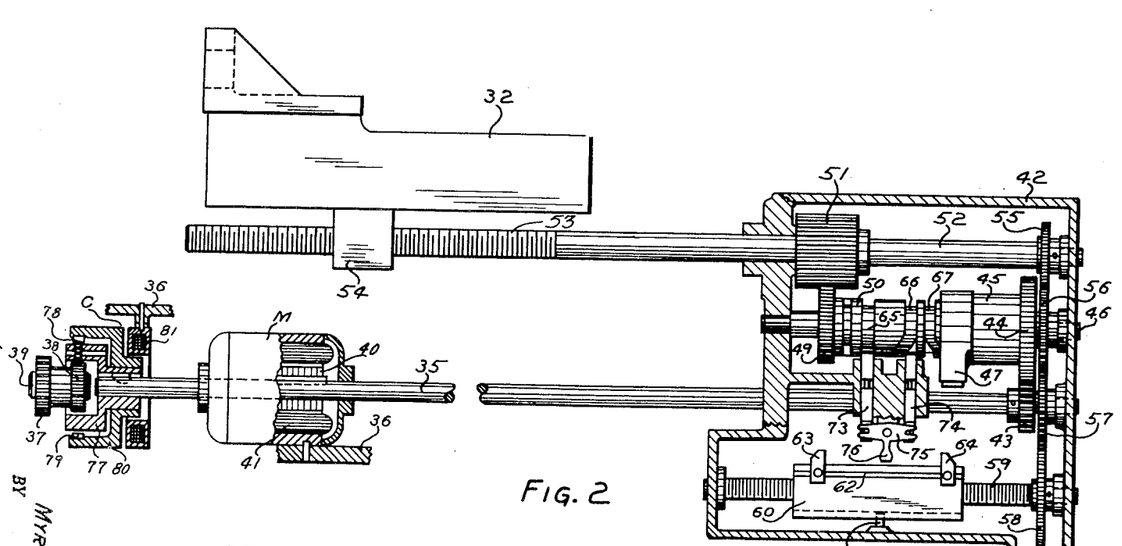
Fig. 2 is a diagrammatic view partly in elevation and partly in section showing the slide and the actuating mechanism therefor.
Figure 3:
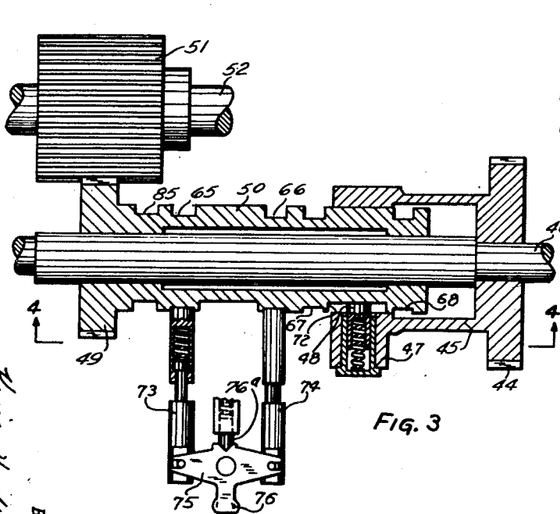
Fig. 3 is a cross sectional view of the clutch of the slide actuating mechanism shown in Fig. 2.

The box 42 is provided with an internal bracket having a pair of parallel bores (see Fig. 2) in which are slidably mounted identical two-part stop plungers indicated in their entireties by the reference numerals 73 and 74 and each comprising inner and outer plunger parts operatively interconnected and held in extended relationship with respect to each other by a coil spring, see Fig. 3. The outer parts of the two-part plungers 73 and 74 are provided at their outer ends with forks which are embraced by the forked ends of a lever 75 that is rockably supported by the internal bracket that carries the plungers. The ends of the lever 75 are provided with notches in which are located pins carried by the plungers 73 and 74.

The lever 75 intermediate its end has a laterally extending arm 76, the outer end of which is of spherical formation and is located intermediate the cam lugs 63 and 64 on the block 60, wherefore when said block is moved in opposite directions said cam lugs will abut one side or the other of said arm 76 to rock the lever 75 in one direction or the other to move either the two-part plunger 73 inwardly and the two part plunger 74 outwardly or vice versa. A spring point 76a is provided to restore and hold lever 75 in an inactive position. When the lever 75 is in its inactive position as shown in Fig. 2 two-part plungers 73 and 74 will have their inner ends extending slightly into the grooves 65 and 66 of the hub 50 and said plungers at such time prevent any axial shifting movement of the hub but permit the free rotation thereof.

It will further be noted that the driving plunger 48 depending upon the axial position of the hub 50 extends at all times either into the annular grooves 67 and 68 or into the curved groove 71 of the hub, said driving plunger 48 being shown in Fig. 3 as extending into the straight walled section 72. The manner in which the elements contained in the box 42 function will be described hereinafter.

Referring to Fig. 2, the planetary gear unit and its magnetic controller C on the shaft 35 will now be described. A pinion carrier 77 surrounds the gear 38 and has its hub keyed to the shaft 35. The carrier 77 rotatably mounts one or more pinions 78 which mesh with the gear 38 and with an internal gear 79 formed integral with or secured to a housing 80 which surrounds the pinion carrier 77 and has its hub freely rotatable on the hub of said carrier. The magnetic controller C comprises an electromagnet coil 81 indicated in the form of a ring which surrounds the hub of the housing 80 and is held stationary relative to the gear box 36 and the magnetic forces of which when the magnet is energized act to hold the housing 80 against rotation. It will be recalled that when the work spindle 31 is rotating the gears 37 and 38 are also rotating. It will be seen that when the magnet 81 is deenergized and the housing 80 is free to turn the rotation of the gear 38 imparts rotation to the pinions 78 of the carrier 77 and the pinions in turn impart through the internal gear 79 rotation of the housing 80, while the pinion carrier 77 remains stationary. However, as soon as the magnet 81 is energized and the housing 80 is held against rotation the rotation of the pinions 78 travel around the internal gear 79 and rotative movement is imparted to the pinion carrier 77 and to the shaft 35.

Figure 8:
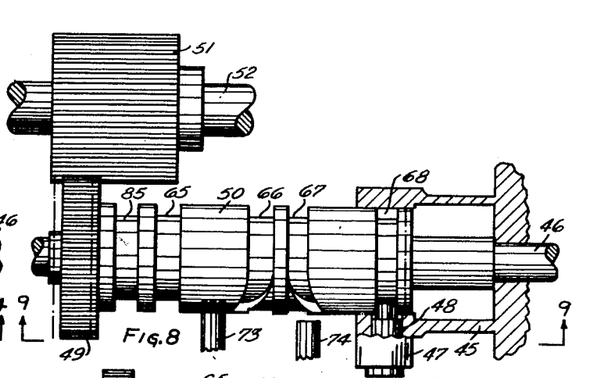
Fig. 8 (sheet 3) is a partial elevational and partial sectional view similar to Fig. 3 but illustrating a different relationship between the parts of the clutch and slide actuating mechanism than is shown in Fig. 3.
Figures 13, 16:
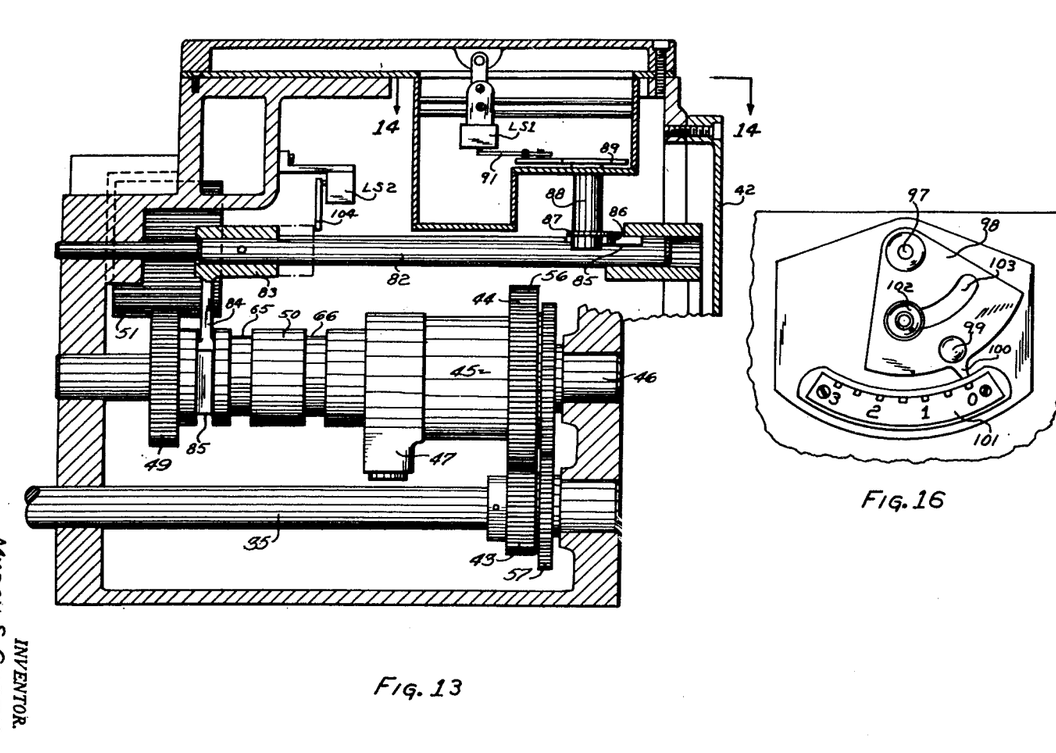
Fig. 13 (sheet 5) is an enlarged partial elevational and partial sectional view of and through the slide actuating mechanism taken along different lines than Fig. 2 and showing part of the control device for effecting the predetermined dwell period and the energization and deenergization of the rapid traverse motor and of the magnetic clutch which controls the feeding movement of the slide.
Fig. 16 (sheet 5) is a fragmentary front elevational view taken substantially from line 16—16 of Fig. 15 looking in the direction of the arrows.
Figure 14:
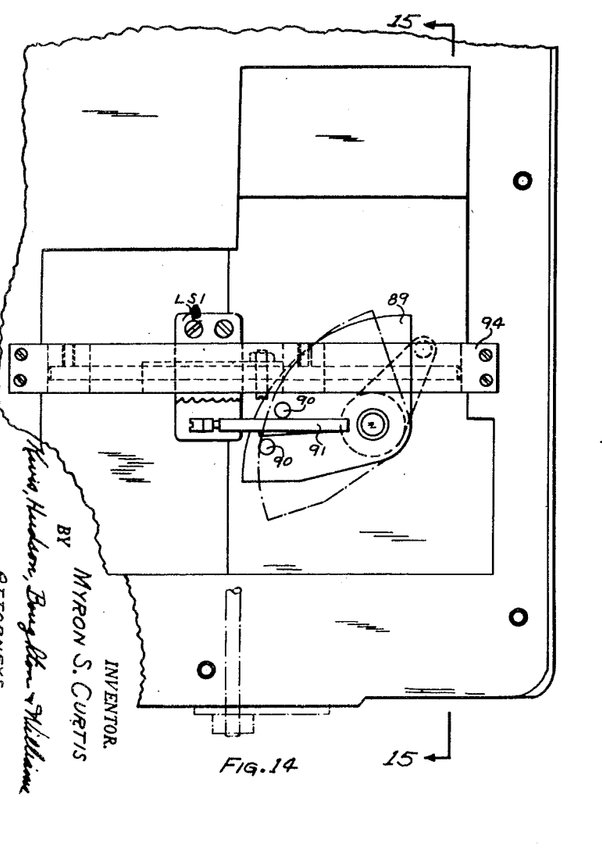
Fig. 14 (sheet 6) is a sectional view on a larger scale taken substantially along lines 14—14 of Fig. 13 looking in the direction of the arrows.
Figures 15, 15A:
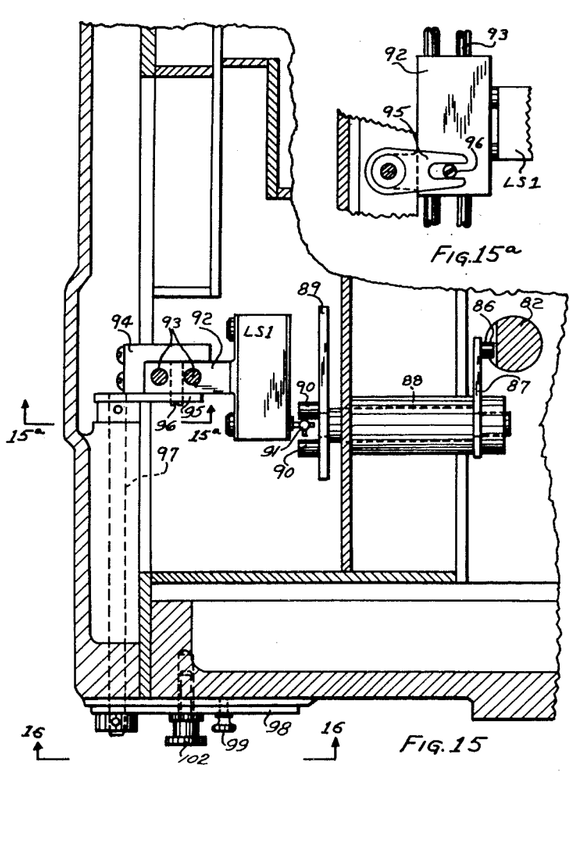
Fig. 15 is a sectional view taken substantially along lines 15—15 of Fig. 14 looking in the direction of the arrows.
Fig. 15a is a fragmentary partial sectional and partial elevational view taken looking from line 15a—15a of Fig. 15.

Assuming that the work spindle 31 is rotating and the magnet 81 is energized while the motor M is deenergized, it will be seen that the shaft 35 is being driven from the work spindle. With this condition and further assuming that the parts are in the relationship shown in Figs. 2 and 3, it will be noted that the driving plunger 48 is in the straight wall section 72 of the curved groove 71 and is driving the hub 50. Also at this time the plungers 73 and 74 extend slightly into the annular grooves 65 and 66 and hold the hub against axial shifting movement. At this time the shaft 52 is rotating in the forward direction and feeding movement is being imparted to the slide 32. It will be noted that at this time the arm 76 of the lever 75 is out of contact with the cam lugs 63 and 64. The feeding movement of the slide 32 continues and this produces movement of the block 60 toward the left as viewed in Fig. 2 until at the end of the feeding movement the cam lug 64 contacts the arm 76 and rocks the lever 75 in a direction to completely withdraw the plunger 74 from the groove 66 and to move the plunger 73 into the groove 65, see Fig. 8. Shortly after the plunger 73 is inserted into the groove 65 the rotation of the hub 50 causes said plunger to ride into the curved groove 69 with the result that the plunger 73 acts on the rotating hub 50 to shift the same axially toward the left and when such shifting movement has brought the gear 49 from the position shown in Fig. 3 to full line position of Fig. 8 the plunger 73 is just about to enter the straight wall section 70 of the groove 69 while the driving plunger 48 is just about to move out of the curved groove 71 and into the annular groove 68, see Fig. 9. The plunger 73 continues to act on the rotating hub 50 to shift the same toward the left until the plunger 73 is in the straight wall section 70 of the groove 69 and forms a positive stop that arrests further rotation of the hub 50, gear 51 and shaft 52 and hence terminates the feeding movement of the slide. At this time the driving plunger 48 is in the annular groove 68 and simply idles around in said groove. It will be noted that the shifting movement of the hub 50 during which the plunger 73 moves from the position shown in Fig. 9 into the straight wall section of the groove 69 as shown in Fig. 10 causes the gear 49 to shift from the full line position of Fig. 8 into the dot and dash line position thereof. The axial shifting movement of the hub 50 that results in moving the gear 49 from the full line position of Fig. 8 into the dot and dash line position thereof is utilized for controlling the magnet 81 and the motor M in a manner now to be described. The box 42 is provided with supporting openings in which a rod 82 is slidably mounted, see Fig. 13, and said rod extends parallel to the shafts 52 and 46. The rod 82 has fixed to it adjacent its left hand end a sleeve 83 which has a depending fork 84 engaging in an annular groove 85 formed in the hub 50, wherefore axial shifting movement of the hub 50 effects a corresponding endwise shifting movement of the rod 82. The rod 82 adjacent its right hand end as viewed in Fig. 13 is provided with an elongated recess 85 and into which extends a pin 86 carried by one end of a lever 87, the other end of which is fixed to a rock shaft 88 mounted in suitable supports in the box 42 (see Figs. 13 and 15). The length of the recess 85 and the location of the lever 87 and pin 86 are such that the right hand end of the recess contacts said pin to rock the lever and shaft 88 substantially at the end of the left hand shifting movement of the rod 82 and the left hand axial movement of the hub 50 and during the time that the hub 50 is shifting toward the left to move the gear 49 from the full line position of Fig. 8 into the dot and dash line position thereof. The rocking movement of the shaft 88 just referred to causes rocking movement to be imparted to the plate 89 fixed to the opposite end of the shaft 88 and provided with a pair of spaced pins 90. The trip arm 91 of a limit switch LS1 extends between the pins 90, wherefore rocking movement of the plate 89 from the full line position of Fig. 14 to the dot and dash line position thereof effects actuation of the arm 91 to close the contacts of the switch LS1 and the closing of said switch effects deenergization of the magnet 81 and energization of the motor M, as will later be explained.

The switch LS1 is carried by a bracket arm 92 which has a pair of spaced openings through which rods 93 extend. The rods 93 are held in fixed position by a bracket 94 located in the box 42. The arm 92 which carries the switch LS1 can have linear movement along the rods 93 and it will be noted that if said arm is moved linearly of the rods the relationship of the trip arm 91 of the switch LS1 with respect to the pins 90 is changed, that is the effective radius of the trip arm can be varied and the actuation of the switch LS1 occurs at different times in the rocking movement of the plate 89. The adjusting movement is imparted to the switch LS1 by means of a lever 95 which has a forked end that straddles a pin 96 carried by the arm 92 (see Figs. 15 and 15a). The lever 95 is fixed to the inner end of a shaft 97 that is rockably supported in the cover of the box 42 and extends outwardly of the front side of said cover. A segmental plate 98 is fixed to the outwardly extending end of the shaft 97 and is provided with a knob 99 by which the operator can rock said plate from the front side of the machine to rock the shaft 97 and adjust the position of the switch LS1 (see Figs. 15 and 16). The plate 98 is provided with a pointer 100 that cooperates with a scale 101 fixed on the front side of the box 42 and indicating the adjusted position of the switch LS1. The plate 98 can be locked in adjusted position by means of a lock screw 102 that extends through an arcuate slot 103 in the plate 98 and screws into a threaded bore in the front of the box 42. The construction just described provides an adjustable regulation of the point at which the switch LS1 will be actuated during the left hand shifting movement of the rod 82 that is occasioned by the left hand shifting of the hub 50 after the plunger 73 has been fully inserted into the groove 65 by the rocking of the lever 75 by the cam lug 64 on the block 60, it being recalled that this occurs at the end of the feeding movement of the slide. Therefore the operator can manually vary by means of the adjustable plate 98 the time period between the termination of the feeding movement of the slide and the energization of the motor M to effect the rapid return movement thereof, that is, the construction enables the operator to select the proper dwell period for the cutting tool to remain in cutting engagement with the work piece after the feeding movement has terminated and this period will vary in accordance with the character or material of the work piece, the type and depth of the cut and other conditions present in each cutting operation. As already explained, the actuation of the switch LS1 deenergizes the magnet 81 and energizes the motor M. As soon as the magnet 81 is deenergized the shaft 35 ceases to be driven through the planetary gearing by the gear 38 and is driven directly by the motor M at a fast speed. The energization of the motor M causes the shaft 35 to be driven at a rapid speed but in the opposite direction, with the result that the sleeve 45 and driving plunger 48 rotate in the reverse direction.

Figure 9:
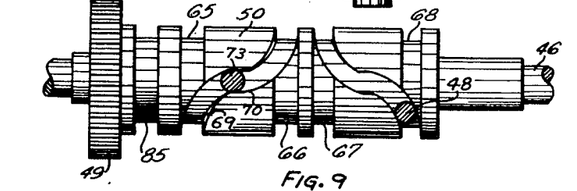
Fig. 9 is an elevational view taken substantially from line 9—9 of Fig. 8 looking in the direction of the arrows with certain of the parts in section.
Figure 10:
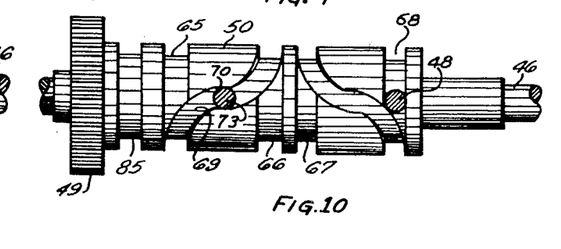
Fig. 10 is a view similar to Fig. 9 but showing a different relationship between the parts of the clutch.

This reverse rotation of the driving plunger 48 causes said plunger to ride into the curved groove 71 and act upon the hub 50 to shift the same toward the right until the parts are in the position shown in Fig. 3, it being understood that the right hand shifting movement of the hub 50 causes the plunger 73 to ride out of the position shown in Fig. 9 and into the annular groove 65. It will also be understood that as soon as the plunger 73 moves out of the straight walled section 70 of the curved groove 69 and the driving plunger 48 engages in the straight walled section 72 of the curved groove 71 the hub 50 can be driven in the reverse direction by the driving plunger 48 and reverse rotation will be imparted to the shaft 52 at a rapid rate to cause the rapid return of the slide 32. The reverse rotation of the shaft 35 also causes the block 60 to move toward the right, whereupon the cam lug 64 moves out of engagement with the arm 76 of the lever 75 and the plungers 73 and 74 return to their normal position as indicated in Fig. 3 under the action of the spring point 76a. When the slide reaches the end of its return movement the cam lug 63 engages the arm 76 and rocks the lever 75 to completely withdraw the plunger 73 from the groove 65 and to completely insert the plunger 74 into the groove 66. When this occurs the plunger 74 rides into the curved groove 69 and causes axial shifting movement of the hub 50 toward the right until the driving plunger 48 has moved out of the curved groove 71 into the annular groove 67 and the plunger 74 has moved into the straight walled section 70 of the groove 69 and positively stopped the rotation of the hub 50, see Figs. 11 and 12. With the rotation of the hub 50 in the reverse direction thus terminated rotation of the shaft 52 ceases and the return movement of the slide 32 is stopped. The shifting movement of the hub 50 toward the right, as just described, causes the rod 82 to shift toward the right as viewed in Fig. 13 to effect a closing of the switch LS2, the trip arm 104 of which lies in the path of movement of the sleeve 83 carried by the rod 82, see dot-dash line position of said sleeve in Fig. 13. The actuation of the switch LS2 deenergizes the motor M and energizes the magnet 81, whereupon the shaft 35 is again rotated at the feeding speed through the planetary gearing and the slide is moved forwardly with the feeding movement, it being understood that the rotation of the shaft 35 in the forward direction causes the plungers 48, 73 and 74 and the hub 50 to return from the relationship shown in Figs. 11 and 12 to that shown in Fig. 3, at which time the plunger 48 is driving the hub 50 in the forward or feeding direction and the block 60 is moving toward the left and the cam lug 63 is disengaged from the arm 76 of the lever 75.

Figure 17:
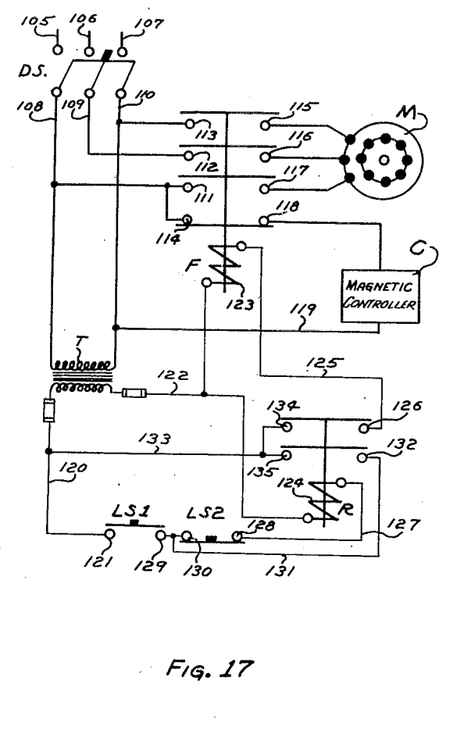
Fig. 17 (sheet 4) is a diagram of the electrical control for the rapid traverse motor and the magnetic clutch which controls the feed of the slide, and in this instance the control provides for rapid return of the slide after the dwell period with the full forward movement of the slide being at the feeding rate.

The manner in which the switches LS1 and LS2 are actuated and the fact that the actuation of said switches effects, respectively, a deenergization of the magnet 81 and an energization of the motor M and an energization of the magnet 81 and a deenergization of the motor M having been explained the circuits which said switches control will now be described with reference to the diagram of Fig. 17.

The lines 105, 106 and 107 extend to a source of three-phase electric energy. These lines can be connected, respectively, to lines 108, 109 and 110 by main disconnect switch DS. The lines 108, 109 and 110 are connected, respectively to contacts 111, 112 and 113 of a contactor F. The line 108 is also connected to the contact 114 of the contactor F. The contacts 115, 116 and 117 of the contactor are connected to the motor M while the contactor 118 thereof is connected to the magnetic controller C and said controller is connected by the line 119 with the line 110. The contacts 113 and 115, 112 and 116, 111 and 117 are normally disconnected from each other while the contacts 114 and 118 are normally interconnected and hence the magnetic controller C is normally energized and the motor M is normally deenergized. The lines 108 and 110 are connected to the primary of a transformer T, the secondary of which transformer is connected by line 120 to contacts 121 of the switch LS1. The secondary of the transformer T is connected by a line 122 with one end of the coil 123 of the contactor F and one end of the coil 124 of the relay R. The other end of the coil 123 is connected by line 125 to a contact 126 of the relay R, while the other end of the coil 124 of the relay R is connected by line 127 with the contact 128 of the switch LS2. The contact 129 of the switch LS1 and the contact 130 of the switch LS2 are interconnected with each other and by means of a line 131 with the contact 132 of the relay R. The line 120 is connected by line 133 with the contacts 134 and 135 of the relay R, it being noted that the contacts 134 and 126 and 135 and 132 of the relay R are normally open. The switch LS1 is a normally open switch and the switch LS2 is a normally closed switch and from the diagram it will be seen that when the main DS switch is closed that normally the magnetic controller is energized and the motor M is idle. However, when the switch LS1 is closed then the coil 124 of the relay R is energized and contacts 134, 126 and 135, 132 of said relay closed. The closing of the contacts 132 and 135 of the relay R establishes a holding circuit through lines 133, 131, switch LS2 and line 127 to maintain the coil 124 of the relay energized. As soon as the contacts of the relay R are closed the coil 123 of the contactor is energized through the lines 122 and 125 and hence the contacts 114 and 118 are open to deenergize the magnetic controller C while the other contacts of the contactor F are closed to energize the motor M and to cause the return movement of the slide. As soon as the return movement of the slide is initiated the switch LS1 opens but the coil 124 of the relay R remains energized due to the holding circuit. At the end of the return movement of the slide the switch LS2 is opened and the coil 124 of the relay R is deenergized, whereupon the contactor F moves to normal position effecting deenergization of the coil 123 and the motor M and energization of the magnetic controller C and the feeding movement is restored to the slide.

In the construction previously described only a rapid return movement is imparted to the slide, the forward movement of the slide being at the feeding rate.

The invention has been described as used in a machine wherein the forward movement of the slide is entirely at the feeding rate, while the return movement of the slide is at the rapid rate. The invention can also be used in an arrangement wherein the first part of the forward movement of the slide is at a rapid rate until the slide reaches the position where its feeding movement should begin, while the entire return movement of the slide is at the rapid rate.

Figure 18:
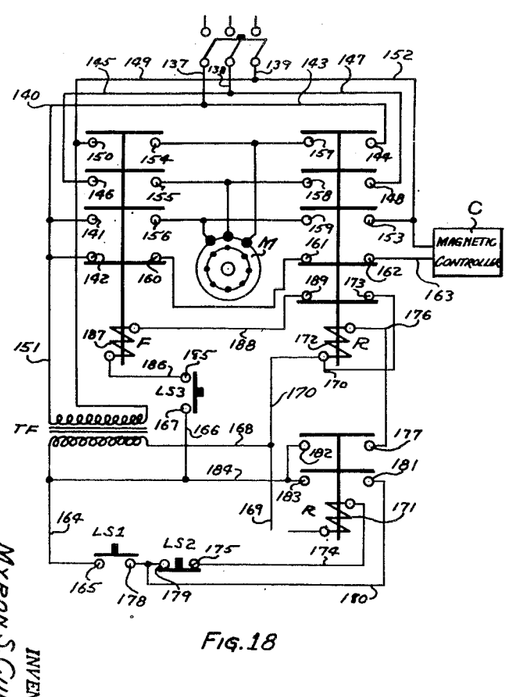
Fig. 18 (sheet 7) is a diagram of an electrical control different from the control shown in Fig. 17 in that the slide is given a rapid return movement and a rapid forward movement to feeding position by the rapid traverse motor, while the magnetic clutch is engaged merely to provide the feeding movement to the slide.
Figure 19:
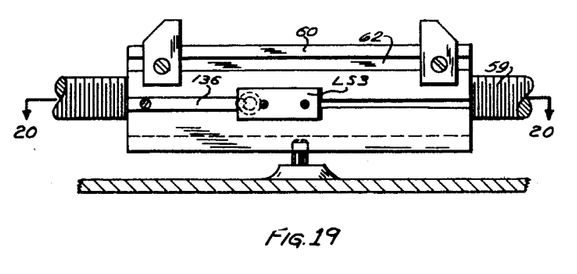
Fig. 19 is a fragmentary partial elevational and partial sectional view of a modified arrangement of control mechnism which is used with the electrical control shown in Fig. 18.
Figure 20:
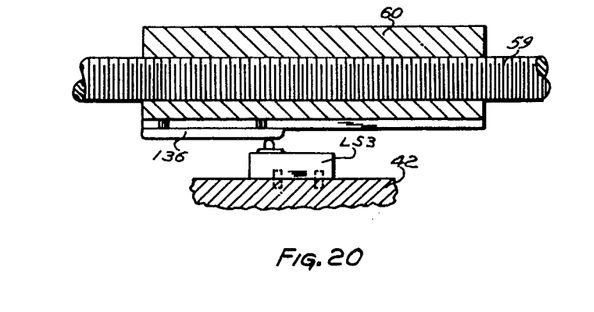
Fig. 20 is a sectional view taken substantially along line 20—20 of Fig. 19 looking in the direction of the arrows.

An embodiment of the invention as used in the last mentioned arrangement is disclosed in Figs. 18 to 20 inclusive and wherein it will be noted that the block 60 is provided on its side with a longitudinally adjustable elongated dog 136 which has a predetermined length and which actuates a switch LS3 supported by the box 42 for a purpose which will soon become apparent. When the invention is employed in this arrangement the motor M is a reversible motor and during the rapid return movement of the slide it operates in the reverse direction and during the rapid forward movement of the slide prior to the feeding movement it operates in the forward direction.

Referring to the diagram shown in Fig. 18, the lines 137, 138 and 139 of the motor circuit are connected by a main switch to a source of three-phase electric energy. The line 137 is connected by a line 140 to the contacts 141 and 142 of the contactor F and is also connected to one side of the primary of the transformer TF. The line 137 is connected by line 143 to the contact 144 of the contactor R. The line 138 is connected by 145 to the contact 146 of the contactor F and by line 147 to the contact 148 of the contactor R. The line 139 is connected by line 149 to the contact 150 of the contactor F and said line 149 is connected by line 151 to the other side of the primary of the transformer TF. The line 139 is also connected by line 152 to the contact 153 of the contactor R and to the magnetic clutch. The contacts 154, 155 and 156 of the contactor F are paired with the contacts 150, 146 and 141 thereof and are connected to the motor M. The contacts 157, 158 and 159 of the contactor R are paired with the contacts 144, 148 and 153 of the said contactor and are also connected to the motor M. The paired contacts of the normally open contactor F when closed effect forward energization of the motor M, while the paired normally open contacts to the contactor R when closed effect reverse energization of the motor M as will be readily understood. The contact 142 of the contactor F is paired with a contact 160 which is connected to the contact 161 of the contactor R and said latter contact is paired with the contact 162 that is connected by the line 163 with the magnetic controller. The contacts 142 and 160 and 161 and 162 are normally closed and are arranged in series in the circuit to the magnetic controller, wherefore if either pair of contacts is open said controller is deenergized.

The control circuit includes the secondary of the transformer TF and one end of said secondary is connected by line 164 to the contact 165 of the switch LS1 and by line 166 (connected to line 164) to the contact 167 of switch LS3. The line 168 connects the other end of the secondary to lines 169 and 170. The line 169 is connected to one end of the coil 171 of the relay R while the line 170 is connected to one end of the coil 172 of the contactor R and to the contact 173 of said contactor. The coil 171 is connected by line 174 to contact 175 of switch LS2 while the coil 172 is connected by line 176 to contact 177 of relay R. The contacts 178 and 179 of switches LS1 and LS2 are interconnected and are also connected by line 180 with contact 181 of the relay R, the contacts 182 and 183 of said relay being connected by line 184 with line 164 through line 166. The contact 185 of switch LS3 is connected by line 186 to one side of the coil 187 of the contactor F, the other side of which coil is connected by line 188 with contact 189 of the contactor R.

Assuming that the slide is moving forward at the feeding rate the parts will be in the relationship shown in the diagram of Fig. 18 and normally open switches LS1 and LS3 are open and normally closed switch LS2 is closed. At this time the motor M is deenergized and the magnetic controller is energized and the trip arm of the switch LS3 is out of engagement with the elongated dog 136. When the slide reaches the end of its feeding movement and the desired dwell period has elapsed the switch LS1 is closed as previously described, whereupon coil 171 of relay R is energized and contacts 183 and 181 of said relay closed to establish the holding circuit for the coil 171. Also contacts 182 and 177 of said relay are closed, whereupon coil 172 of contactor R is energized and contacts 161 and 162 of said contactor are open to break the circuit to the magnetic controller and deenergize the same. Also at this time the contacts 189 and 173 of said contactor R are open, thus preventing energization of the coil 187 of the contactor F. Likewise, at this time the contacts 157, 144, 158, 148 and 159, 153 of the contactor R are closed and the motor M is energized for reverse rotation, whereupon the slide moves rearwardly at the rapid rate, the shaft 35 previously described being driven directly by the motor M. During this rearward movement of the slide the trip arm of the switch LS3 rides upon the dog 136 and said switch is closed but this has no effect on the coil 187 of the contactor F since the circuit through said coil has been interrupted by the opening of the contacts 189 and 173 of the contactor R. When the slide reaches the end of its rearward movement the switch LS2 is opened as in the previously described arrangement, with the result that coil 171 of relay R is deenergized and contacts 182 and 177 thereof opened to deenergize the coil 172 of contactor R. Also contacts 183 and 181 of the relay R are open thus interrupting the holding circuit. The deenergization of coil 172 of the contactor R causes the contacts thereof in the reverse motor circuit to open while contacts 189 and 173 of this contactor are now closed, thus establishing the circuit through the coil 187 of contactor F, it being recalled that switch LS3 is closed. When the coil 172 of contactor R is deenergized the contacts 161 and 162 of said contactor which are in the circuit to the magnetic controller are closed but this does not affect energization of said controller inasmuch as the energization of coil 187 of the contactor F has caused contacts 142 and 160 of this latter contactor to open and thereby interrupt the circuit to the magnetic controller. The energization of the coil 187 closes the contacts of the contactor F which are in the forward circuit of the motor and thus the motor M is now energized for forward operation to cause rapid forward movement of the slide. This reversal of the motor drive from reverse to forward causes the clutch parts to function in rapid motion similarly to the way they functioned when rapid return was changed to forward feeding movement as previously described. This rapid forward movement of the slide continues and causes the block 60 to move toward the left until the trip arm of the switch LS3 moves out of engagement with the dog 136 and said switch opens, whereupon the coil 187 of the contactor F is deenergized and the motor circuit is interrupted while the magnetic controller circuit is closed by the closing of the contacts 142 and 160 of the contactor F.

From the foregoing it will be seen that rapid movement is imparted to the slide in both the rearward direction and in the forward direction up to the point where the feeding movement is to commence and this point is determined by the position of the adjustable dog 136. It will be understood that in the arrangement just described the predetermined variable dwell period is obtained in the same manner as in the first described arrangement and that the plungers 48, 73 and 74 and the hub 50 with its system of grooves function in the same way.

It will be noted that in both arrangements the operator can selectively obtain a dwell period of predetermined duration following the end of the feeding movement of the slide and prior to the commencement of the rapid return movement thereof. Consequently the proper dwell period can be obtained for various conditions present in the machining of different kinds of work pieces and in the taking of various forms of cuts therein.

Although several embodiments of the invention have been described herein by way of example, it will be understood that the invention is susceptible of various modifications and adaptations within the scope of the appended claims.

Having thus described my invention, I claim:

1. In a machine having a movable part, a driven shaft for moving said part, a drive shaft, actuating means for rotating said drive shaft in opposite directions, control means for said actuating means, a driving member and an axially shiftable driven member operatively connected respectively with said drive and driven shafts, said members having cooperating means acting automatically upon rotation of the driving member in opposite directions to shift the driven member to establish a driving connection between said members, stop means operatively controlled in correlation to the movement of the part and acting on said driven member when said part reaches a predetermined position in its movement in one direction to shift the driven member in a direction to interrupt the driving connection between the members and to stop said driven member and the movement of said part, and means operatively associated with said driven member and with said control means and actuated by said shifting of the driven member by the stop means to operate said control means to effect after a predetermined time delay a reverse rotation of said drive shaft and driving member, whereupon the driving member automatically causes shifting of the driven member to reestablish the driving connection between said members and cause said part to move in the opposite direction, said last named means including a shiftable part operatively connected with said driven member and shifted thereby.

2. In a machine having a movable part, a driven shaft for moving said part, a drive shaft, actuating means for rotating said drive shaft in one direction at a relatively slow speed and in the opposite direction at a relatively fast speed, control means for said actuating means, a driving member and an axially shiftable driven member operatively connected respectively with said drive and driven shafts, said members having cooperating means acting automatically upon rotation of the driving member in opposite directions to shift the driven member in one or the other directions to establish a driving connection between said members, stop means operatively controlled in correlation to the movement of the part when said drive shaft is rotating in said one direction at said relatively slow speed and acting on said driven member when said part reaches a predetermined position to shift the driven member in a direction to interrupt the driving connection between the members and to stop said driven member and the slow movement of said part, and means operatively associated with said driven member and with said control means and actuated by said shifting of the driven member by the stop means in a direction to interrupt the driving connections between the members to operate said control means to effect after a predetermined time delay rotation of said drive shaft and driving member in the opposite direction at said relatively fast speed, whereupon the driving member automatically causes shifting of the driven member to reestablish the driving connection between said members and cause said part to move in the opposite direction with a relatively fast movement, said last named means including a shiftable part operatively connected with said driven member and shiftable thereby.

3. In a machine having a movable part, a driven shaft for moving said part, a drive shaft, actuating means for rotating said drive shaft in opposite directions, control means for said actuating means, a driving member and an axially shiftable driven member operatively connected respectively with said drive and driven shafts, said members having cooperating means acting automatically upon rotation of the driving member in opposite directions to shift the driven member in one or the other direction to establish a driving connection between said members, stop means operatively controlled in correlation to the movements of the part in opposite directions and acting on said driven member when said part reaches predetermined positions during its movements in opposite directions to shift the driven member in a direction to interrupt the driving connection between the members and to stop said driven member and said part, and means operatively associated with said driven member and with said control means and actuated by the said shifting of the driven member by the stop means at the end of the predetermined movement of said part in one direction to operate said control means to effect after a predetermined time delay a reverse rotation of said drive shaft and driving member, said last named means also being actuated by the shifting of the driven member by the stop means at the end of the predetermined movement of said part in the opposite direction to operate said control means to effect immediately a reverse rotation of said drive shaft and driving member, wherefore each time that the direction of rotation of the driving member is changed the driven member is automatically shifted to reestablish the driving connection between said members and to cause said part to move in the opposite direction.

4. In a machine having a movable part, a driven shaft for moving said part, a drive shaft, actuating means for rotating said drive shaft at a relatively slow speed in one direction and at a relatively fast speed in the opposite direction, control means for said actuating means, a driving member and an axially shiftable driven member operatively connected respectively to said drive and driven shafts, said members having cooperating means acting automatically upon rotation of the driving member in opposite directions to shift the driven member in one or the other direction to establish a driving connection between said members, stop means operatively controlled in correlation to the movements of the part and acting on said driving member when said part reaches a predetermined position during its movement in each direction to shift the driven member in a direction to interrupt the driving connection between the members and to stop said driven member and the movement of said part, and means operatively associated with said driven member and with said control means and actuated by said shifting of the driven member by the stop means upon said part reaching said predetermined position during its relatively slow movement to operate said control means to effect after a predetermined time delay a reverse rotation of said drive shaft and driving member, said last named means also being actuated by the shifting of the driven member by the stop means upon said part reaching said predetermined position during its fast movement to operate said control means to effect immediately reverse rotation of said drive shaft and driving member, wherefore each reverse rotation of the driving member automatically causes shifting of the driven member to reestablish the driving connection between said members and cause said part to move either at the relatively slow rate or the relatively fast rate.

5. In a machine as defined in claim 1 and wherein the means which is operatively associated with the driven member and with the control means includes relatively adjustable elements to vary the predetermined time delay occurring prior to the reversal of said drive shaft and driving member.

6. In a machine as defined in claim 1 and wherein the means which is operatively associated with the driven member and with the control means includes relatively adjustable elements to vary the predetermined time delay occurring prior to the reversal of said drive shaft and driving member, and manually actuated means presettable to effect adjustment of said adjustable elements to obtain a desired predetermined time delay.

7. In a machine tool having a rotatable spindle and a slide movable relative thereto, a driven shaft for moving said slide, a drive shaft, actuating means for rotating said drive shaft in timed relation to said spindle in one direction at a feeding rate and in the opposite direction at a faster rate, control means for said actuating means, a driving member and an axially shiftable driven member operatively connected respectively with said drive and driven shafts, said members having cooperating means acting automatically upon rotation of the driving member in opposite directions to shift the driven member in one or the other direction to establish a driving connection between said members, stop means operatively controlled in correlation to the feeding movement of said slide and acting on said driven member when said slide reaches a predetermined position during its feeding movement to shift the driven member in a direction to interrupt the driving connection between the members and to stop said driven member and the feeding movement of said slide, and means operatively associated with said driven member and with said control means and actuated by said shifting of the driven member by the stop means to operate said control means to effect after a predetermined dwell period reverse rotation of said drive shaft and driving member at said relatively fast rate, whereupon the driving member then automatically causes shifting of the driven member to reestablish the driving connection between said members and cause said slide to move in the opposite direction at said relatively fast rate, said last named means including a shiftable part operatively connected with said driven member and shifted thereby.

8. In a machine tool having a rotatable spindle and a slide movable relative thereto, a driven shaft for moving said slide, a drive shaft, actuating means operatively associated with said spindle and said drive shaft for rotating said drive shaft in opposite directions with a portion of the rotation in one direction being in timed relation to the rotation of said spindle to produce a feeding movement of said slide and the rotation of said drive shaft in the opposite direction being at a faster rate, control means for and operatively associated with said actuating means, a driving member and an axially shiftble driven member operatively connected respectively with said drive and driven shafts, said members having cooperating means acting automatically upon rotation of the driving member in opposite directions to shift the driven member in one or the other direction to establish a driving connection between said members, stop means operatively controlled in correlation to the movements of said slide in opposite directions and acting on said driven member when said slide reaches the end of its feeding movement to shift the driven member in a direction to interrupt the driving connection between the members and to stop said driven member and the feeding movement of said slide and acting on said driven member when said slide reaches a predetermined position during its movement in the opposite direction to shift the driven member in a direction to interrupt the driving connection between the members and to stop said driven member and the movement of said slide in said opposite direction, and means operatively associated with said driven member and with said control means and actuated by said shifting of the driven member by the stop means at the end of the feeding movement of the slide to operate said control means to effect after a predetermined dwell period reverse rotation of said drive shaft and driving member at said faster rate, said last named means also being actuated by the shifting of the driven member by the stop means at the end of the movement of said slide in said opposite direction to operate said control means to effect immediately reverse rotation of said drive shaft and driving member, wherefore the driving member automatically causes shifting of the driven member to reestablish the driving connection between said members and cause said slide to reverse its direction of movement at the end of its feeding movement and at the end of its movement in the opposite direction.

9. In a machine tool as defined in claim 7 and wherein the means which is operatively associated with the driven member and with the control means includes relatively adjustable elements to vary the dwell period.

10. In a machine tool having a rotatable spindle and a slide movable relative thereto, a driven shaft for moving said slide, a drive shaft, actuating means for rotating said shaft in opposite directions with the rotation in one direction including a portion in timed relation with said spindle and a portion at a faster rate while the rotation of said drive shaft in the opposite direction is at said faster rate, control means for said actuating means, a driving member and an axially shiftable driven member operatively connected respectively with said drive and driven shafts, said members having cooperating means acting automatically upon rotation of the driving member in opposite directions to shift the driven member in one or the other direction to establish a driving connection between said members, stop means operatively associated with said driven member, cam means movable in correlation to the movement of said slide and operatively associated with said stop means to actuate the latter to act on said driven member when said slide reaches predetermined positions in its movements in opposite directions to shift the driven member in a direction to interrupt the driving connection between the members and to stop said driven member and the movements of said slide, and means carried by said cam means and operatively associated with said control means and acting at a predetermined point in the movement of said slide in said one direction to cause said control means to effect a change from said faster rotation of the drive shaft to said rotation thereof in timed relation with said spindle.

11. In a machine tool as defined in claim 10 and wherein there is means operatively associated with said driven member and with said control means and actuated by said shifting of the driven member by the stop means at the end of the movement of said slide in said one direction to operate said control means to effect after a predetermined dwell period reverse rotation of said drive shaft and driving member at said faster speed, wherefore the driving member then automatically causes shifting of the driven member to reestablish the driving connection between said members and cause said slide to move at said faster rate in said opposite direction.

12. In a machine tool as defined in claim 10 and wherein means is operatively associated with the driven member and with the control means and is actuated by said shifting of the driven member by the stop means in stopping the movement of said slide in said one direction to operate said control means to effect after a predetermined dwell period reverse rotation of said drive shaft and driving member and a movement of said slide in said opposite direction and is actuated by said shifting of the driven member by the stop means at the end of the movement of said slide in said opposite direction to operate said control means to effect immediately reverse rotation of said drive shaft and driving member to cause movement of said slide in said one direction.

13. In a machine tool having a rotatable spindle and a slide movable relative thereto, a driven shaft for moving said slide, a drive shaft, operative connections between said spindle and said drive shaft for rotating said drive shaft in one direction in timed relation to said spindle at a feeding rate and including a planetary gear unit and a magnetic controller therefor, an electric motor for rotating said drive shaft in the opposite direction at a faster rate, control means for said controller and said motor and including electrical control circuits, a driving member and an axially shiftable driven member operatively connected respectively with said drive and driven shafts, said members having cooperating means acting automatically upon rotation of the driving member in opposite directions to shift the driven member to establish a driving connection between said members, stop means operatively controlled in correlation to the feeding movement of said slide and acting on said driven member when said slide reaches a predetermined position during the feeding movement of said slide to shift said driven member to interrupt the driving connection between said members and stop the feeding movement of the slide, and means operatively associated with said driven member and with said control means and actuated by said shifting of the driven member by the stop means to operate said control means to effect after a predetermined dwell period a deenergization of said magnetic controller and an energization of said motor to cause reverse rotation of said drive shaft and driving member, whereupon the driving member automatically causes shifting of the driven member to reestablish the driving connection between said members and cause said slide to move in the opposite direction at said relatively fast rate.

14. In a machine tool as defined in claim 13 and wherein certain of the electrical control circuits of said control means are connected respectively to said magnetic controller and said motor and include switch means acting to close one only of said certain circuits at a time.

15. In a machine tool having a rotatable spindle and a slide movable relative thereto, a driven shaft for moving said slide, a drive shaft, operative connections between said spindle and said drive shaft for rotating said drive shaft in one direction in timed relation to said spindle at a feeding rate and including a planetary gear unit and a magnetic controller therefor, an electric motor for rotating said drive shaft in the opposite direction at a faster rate, control means for said magnetic controller and said motor and including electrical control circuits, a driving member and an axially shiftable driven member operatively connected respectively with said drive and driven shafts, said members having cooperating means acting automatically upon rotation of the driving member in opposite directions to shift the driven member to establish a driving connection between said members, stop means operatively controlled in correlation to the movements of said slide in opposite directions and acting on said driven member when said slide reaches a predetermined position during its feeding movement to shift said driven member to interrupt the driving connection between said members and stop the feeding movement of the slide and acting on said driven member when said slide reaches a predetermined position during its movement in the opposite direction to shift said driven member to again interrupt the driving connection between said members and stop the movement of the slide, and means operatively associated with said driven member and with said control means and actuated by said shifting of the driven member by the stop means at the end of the feeding movement of the slide to operate said control means to effect after a predetermined dwell period a deenergization of said magnetic controller and an energization of said motor and actuated by said shifting of the driven member by the stop means at the end of the slide's movement in the opposite direction to operate said control means to effect immediately a deenergization of said motor and an energization of said magnetic controller.

16. In a machine tool having a rotatable spindle and a slide movable toward and away from said spindle, a driven shaft for moving said slide, a drive shaft, operative connections between said spindle and drive shaft for rotating said drive shaft in one direction in timed relation to said spindle at a feeding rate to impart movement to said slide toward said spindle and including a planetary gear unit and a magnetic controller therefor, a reversible electric motor for rotating said drive shaft in opposite directions at a faster rate, control means for said magnetic controller and said motor and including electrical control circuits, a driving member and an axially shiftable driven member operatively connected respectively with said drive and driven shafts, said members having cooperating means acting automatically upon rotation of the driving member in opposite directions to shift the driven member to establish a driving connection between said members, stop means, cam means operated in correlation to the movements of said slide and operatively associated with said stop means to actuate the same to act on said driven member when said slide reaches a predetermined position during the feeding movement thereof to shift said driven member to interrupt the driving connection between said members and stop the feeding movement of the slide and to act on said driven member when said slide reaches a predetermined position during its movement in the opposite direction to shift said driven member to interrupt the driving connection between said members and stop the movement of the slide, means operatively associated with said driven member and with said control means and actuated by said shifting of the driven member by the stop means at the end of the feeding movement of the slide to operate said control means to effect after a predetermined dwell period a deenergization of said magnetic controller and an energization of said motor and actuated by said shifting of the driven member by the stop means at the end of the movement of the slide in the opposite direction to operate said control means to effect immediately a reversal of said motor, and means carried by said cam means and operatively associated with said control means to effect automatically at a predetermined point during the movement of the slide toward said spindle deenergization of said motor and an energization of said magnetic controller to initiate the feeding movement of the slide.

17. A machine tool as defined in claim 15 and wherein the means which is operatively associated with the driven member and with the control means includes relatively adjustable elements to vary the dwell period occurring prior to the energization of said motor, and manually actuated means presettable to effect adjustment of said adjustable elements to obtain a desired dwell period.

MYRON S. CURTIS.

REFERENCES CITED

The following references are of record in the file of this patent:

UNITED STATES PATENTS

| Number | Name | Date |
| --- | --- | --- |
| 1,889,998 | Nelson | Dec. 6, 1932 |
| 2,054,260 | Oberhoffher | Sept. 15, 1936 |
| 2,424,153 | Curtis | July 15, 1947 |